United States Patent [19]

Sibony et al.

[11] Patent Number: 5,192,441
[45] Date of Patent: Mar. 9, 1993

[54] PROCESS AND INSTALLATION FOR BIOLOGICAL TREATMENT, E.G. BY NITRIFICATION AND/OR DENITRIFICATION, OF AN EFFLUENT INCLUDING NITRATED POLLUTION

[75] Inventors: Jacques Sibony, Paris; Gilbert Desbos, Maisons-Laffitte, both of France

[73] Assignee: Omnium de Traitements et de Valorisation (OTV), Courbevoie, France

[21] Appl. No.: 759,146
[22] Filed: Sep. 11, 1991

Related U.S. Application Data

[63] Continuation of Ser. No. 478,865, Feb. 12, 1990, abandoned.

[30] Foreign Application Priority Data

Feb. 14, 1989 [FR] France .................. 89 01886

[51] Int. Cl.$^5$ .................. C02F 3/12; C02F 3/30
[52] U.S. Cl. .................. 210/603; 210/605; 210/616; 210/626; 210/630; 210/151; 210/195.3; 210/202; 210/219; 210/903
[58] Field of Search .................. 210/603, 605, 616, 625, 210/626, 630, 903, 151, 195.3, 204, 205, 208, 219, 220, 259, 631

[56] References Cited

U.S. PATENT DOCUMENTS

| | | | |
|---|---|---|---|
| 3,300,403 | 1/1967 | Kehoe | 210/616 |
| 3,490,590 | 1/1970 | Davies | 210/616 |
| 3,764,525 | 10/1973 | Goodman et al. | 210/615 |
| 3,817,857 | 6/1974 | Torpey | 210/903 |
| 3,855,120 | 12/1974 | Garbo . | |
| 3,930,998 | 1/1976 | Knopp et al. | 210/903 |
| 3,957,632 | 5/1976 | Knopp et al. | 210/903 |
| 4,076,615 | 2/1978 | Olesen et al. | 210/616 |
| 4,099,099 | 2/1977 | Jeris | 210/151 |
| 4,142,970 | 3/1979 | von Hagel et al. | 210/208 |
| 4,162,153 | 7/1979 | Spector | 210/903 |
| 4,200,524 | 4/1980 | Levin | 210/616 |
| 4,263,135 | 4/1981 | Yeagley | 210/629 |
| 4,282,102 | 8/1981 | Rooney | 210/616 |
| 4,315,821 | 2/1982 | Climenhage | 210/903 |
| 4,407,717 | 10/1983 | Teletzke et al. | 210/151 |
| 4,415,454 | 11/1983 | Fuchs | 210/616 |
| 4,500,429 | 2/1985 | Reimann et al. | 210/903 |
| 4,579,655 | 4/1986 | Louboutin | 210/208 |
| 4,693,827 | 9/1987 | Mordorski | 210/605 |
| 4,869,815 | 9/1989 | Bernard et al. | 210/151 |
| 4,919,815 | 4/1990 | Copa et al. | 210/616 |
| 4,927,543 | 5/1990 | Bablon et al. | 210/711 |
| 4,956,093 | 9/1990 | Pirbazari et al. | 210/616 |
| 4,970,000 | 11/1990 | Eppler et al. | 210/605 |

FOREIGN PATENT DOCUMENTS

| | | |
|---|---|---|
| 0058974 | 2/1981 | European Pat. Off. . |
| 53-97260 | 8/1978 | Japan . |
| 54-54453 | 4/1979 | Japan . |
| 545254 | 1/1974 | Switzerland . |

OTHER PUBLICATIONS

Chem.-Ing.-Tech., vol. 51, No. 6, Jun. 1979, pp. 549-559, Verlag Chemie GmbH, Weinheim, DE; K.-P. Becker: "Das Oxitron-System, Ein Neues Biologisches Abasserreinigungs-Verfahren Fur Den BSB5-Abbau Sowie Zur Nitrifikation Und Denitrifikation", (p. 550, FIG. 2).

Korrespondenz Abwasser, vol. 35, No. 3, (1988) pp. 247-252, 255, St. Augustin, W. Germany.

Nitrification and Denitrification Process, publ. No.: 59142897, patent abstract/Japan, Norio, H.

Primary Examiner—Stanley S. Silverman
Assistant Examiner—Christopher Upton
Attorney, Agent, or Firm—Browdy and Neimark

[57] ABSTRACT

A process for the biological treatment by nitrification and/or denitrification of an effluent containing nitrogen pollution includes the following steps:

an incident flow of this water is brought into a mixing zone with at least one compartment in which, by turbulent mechanical agitation, an inconsumable and insoluble granular material, loaded with biomass, is put in homogeneous suspension in this water, and is maintained at a more or less constant mass concentration;

this water and this granular material in suspension are circulated in a separation zone from which is extracted on the one hand clarified water, and on the other hand biomass loaded granular material; and almost all of the active biomass fixed on said granular material is brought back by forced recycling to the mixing zone.

40 Claims, 4 Drawing Sheets

PROCESS AND INSTALLATION FOR BIOLOGICAL TREATMENT, E.G. BY NITRIFICATION AND/OR DENITRIFICATION, OF AN EFFLUENT INCLUDING NITRATED POLLUTION

This application is a continuation of application Ser. No. 07/478,865 filed Feb. 12, 1990, now abandoned.

BACKGROUND OF THE INVENTION

1. Field of the Invention

The invention relates to the biological treatment of domestic or industrial effluent, and drinking water.

As is known, sewage and sometimes drinking water contain materials in suspension, not only mineral but also organic and nitrogen materials. Sewage also contains dissolved or colloidal materials (particles of less than one micron).

In the present invention, a biological treatment processes has been developed according to which a biomass is developed, that is colonies of bacteria which feed on the organic and/or nitrogen materials contained in the fluid to be treated.

2. Description of the Related Art

The biological treatment processes of sewage can be divided into two major categories.

The first category of biological treatment processes involves using activated sludges after pre-treatment. In a so-called "activated sludge" tank where the untreated water arrives, suitable aeration conditions are maintained to supply oxygen to the micro-organisms and to maintain the expansion of the sludges. Appropriate aeration device are used such as pierced tubes in the bottom of the tank or an aeration turbine situated on the surface.

The effluent which comes from this tank passes into a clarifier. At the bottom of the clarifier some of the sludge is drawn off and recycled into the tank to maintain the biological life therein. The excess sludge is eliminated. Y designates the content of biomass in the water, which is maintained generally in the activated sludges tank at a value normally between 2 and 6 g/l., for example equal to 5 g/l.

In general, the thickening of the sludges is effected without intervention of any granular material. In fact, the so-called "activated sludge" process deals in principle with free bacteria or microorganisms.

According to one variation, it has however, already been proposed to add powdered activated charcoal as a purification adjuvant. This is described for example in patent CH-545.254 and in the article "PAC Process" of Mr. John A. Meidle in WATER/ENGINEERING AND MANAGEMENT, June 1982, pp. 33-36. Charcoal is used mainly because of its adsorption capacities allowing it to adsorb non-biodegradable toxics. Taking into account the high price of activated charcoal, it is important to envisage the most efficient regeneration cycles possible, which in practice are complex and energy-consuming. In particular it is necessary to take into account the cost of heating the charged or loaded activated charcoal to 200° C.

According to other variations it was proposed to use calcium carbonate as a sludge adjuvant or even flue dust which is expected to be lost in the excess sludge that is evacuated.

The performances of such a process by activated sludges depends on the ratio of the mass load of incidental pollution (measured in kg/l.). The performance is expressed as a the biological oxygen demand (B.O.D.) for a given period, to the biomass quantity present in the activated sludges tank. Generally one is interested in the parameter B.O.D.5 which corresponds to the biological oxygen demand of a given weight of biomass for 5 days. The ratio, which readjusts the supply of nourishment to the consumption capacity of the biomass, is measured in kg/kg per day or in $d^{-1}$. The higher it is the greater the flow of water supply to be treated and the lower the costs. In practice it varies between 0.1 and 1.

The processes by activated sludges also aim sometimes to treat nitrogen pollution. The pertinent parameter is then the weight of treated nitrogen per kilogram of biomass and per day. This parameter is of the same dimension as above.

The activated sludge techniques are limited by the suitability of the activated sludges, loaded or not, to decantation, which is usually characterized by the MOHLMANN index which corresponds to the volume occupied by one gram of sludge. The lower the index, the better the decantation. In practice the indices recorded vary between a value of 1000 (very bad) and a value of 100 (very good). It is understood that the treatment process can be maintained with contents y of biomass as high as the corresponding MOHLMANN index is low.

In order to increase the performances of an installation it is sought a in the prior art to keep the biomass content in a steady state as high as if possible reaching or even exceeding 10 g/l., but the known processes hardly allow more than 5 to 6 g/l. A priori, it is also sought to reduce the MOHLMANN index.

The second category of treatment processes involves using fixed bacterial. For example the bacteria can be fixed on the granular material of a fluidized bed through which the crude effluent is passed from bottom to top. The maintenance of the bed in a fluidized state without material outflow requires very strict constraints with regard to the supply of the effluent, which may turn out to be incompatible with the size of fluctuations in volume of water to be treated daily. In addition, these fluidized-bed processes present starting difficulties. Finally, the regeneration of the granular material of the bed requires a partial recycling between two levels of the bed, which is energy-consuming. Examples of such process are given by U.S. Pat. No. 3,855,120 and by the article on the OXITRON system published in CHEM-ING-TECH, vol. 51, no. 6, June 1979, pp. 549-559, Verlag Chemie GmBh Weinheim—Germany.

SUMMARY OF THE INVENTION

The object of the invention is to overcome the previously-mentioned inconveniences and to improve the performances of the treatment, especially in the case of nitrogen pollution such as ammonium hydroxide. A further object of the invention is to reduce the space required while bringing about a flexibility of use compatible with the fluctuations of the inlet flow of the crude effluent; thus, investments costs (even running costs) are lower than in the past for a comparable level of performance.

To this effect, the present invention relates to a process for the biological treatment of sewage drinking water containing nitrogen pollution, the steps of which include:

an incident flow of fluid to be treated is brought into a mixing zone with at least one compartment in which, by turbulent mechanical agitation, a substantially inconsumable and insoluble granular material, loaded with biomass, is put in homogeneous suspension in the fluid and is maintained at a substantially constant mass concentration;

this fluid and this granular material in suspension are circulated into a separation zone so as to separate clarified fluid and biomass loaded granular material; and almost the whole of the active biomass fixed to the said granular material is brought back by forced recycling to the mixing zone.

It is to be noted that in the mixing zone, an integral agitation is produced which is very different from the linear supply that is observed for the effluent supply in processes employing a fluidized bed. In addition all of the granular material passes, in principle, into the separation zone.

Thus, the strict operating constraints connected with fluidized beds are obviated, while obtaining purification yields greatly superior to those which could be found for equivalent mass loads in the absence of granular material (activated sludges), all for a moderate investment and operating cost. Further, the granular material can be a cheap mineral material, for example sand, which is easy to recover without excessive energy expenditure.

According to other embodiments of the invention, taken alone or in combination:

when said nitrogen pollution comprises ammonium hydroxide, additional oxygen is injected into the mixing zone, for example in the form of air in an amount sufficient to enhance the development of a nitrificating biomass, fixed on the granular material;

in the case where the nitrogen pollution is in the form of nitrates, a source of organic carbon is also injected into this mixing zone, which is an anaerobic environment (that is without the injection of free oxygen);

in the case where the nitrogen pollution is in an organic form or in the form of ammonium hydroxide, this mixing zone is composed of two zones, one of nitrification (aerobic), then one of denitrification (anaerobic), or conversely with recycling of the sludges and granular material between these two zones;

the granular material that is put in homogeneous suspension is of mineral type, preferably fine sand;

the granular material contained in a non-recycled residual part of the "sludges" is recovered through a separation step of physical or (bio)chemical type (non-thermical) and reinjected, together with active biomass which is stuck thereto, into the mixing zone while poorly adhering sludge separated from this granular material is evacuated;

the concentration of granular material in the mixing zone is maintained approximately at a value between 5 and 100 g/l., or between 5 and 50 g/l.;

if the granular material is fine sand, its concentration is maintained at a value of between 5 and 50 g/l., for example approximately 20 g/l.;

the turbulent agitation induces an internal recycling between 5 and 100 times the incident supply, preferably between 10 and 50, or between 10 and 30 times the incident supply;

the granular material carrying the fixed biomass is returned to the mixing zone by forced recycling in a supply amounting to between 10 and 500% of the incident fluid supply;

said almost whole of the biomass loaded granular material in the incident supply is returned upstream of the mixing zone, or directly in the latter; and the homogeneous suspension is left to degas before entering the separation zone.

It will be noted that in the case (an important one in practice) of a water containing a nitrogen pollution in the form of ammonium hydroxide, with or without any derivation of a residual part of the sludges in excess to be evacuated, there is kept the whole (at least approximately) of the nitrificating bacteria, which develop only slowly but are strongly adherent and which are not separated during the separation step, even in the case of a strong one, with hydrocyclones for example.

The invention also proposes an installation for the biological treatment of pre-treated sewage containing nitrogen pollution comprising:

a mixing zone with at least one compartment into which a pipe opens, for admitting water to be treated, which is fitted with mechanical means for turbulent agitation and which contains a substantially inconsumable and insoluble granular material loaded with fixed biomass, forming a homogeneous suspension of given concentration;

a separation zone downstream of the mixing zone, provided with a drainage channel for the clarified water and a drainage channel for loaded granular material;

a pipe for recycling biomass loaded granular material provided with pumping means, starting from the sludge drainage channel and ending at the mixing zone or upstream of the latter.

According to preferred embodiments:

the mixing zone comprises at least one mixing reactor (or compartment) containing oxygenation means, the oxygenation means are formed by an oxygenation manifold;

the mixing zone comprises, in series, an aerobic nitrification reactor containing an oxygen supply and an anoxic denitrification reactor containing an organic carbon supply;

the mixing zone comprises, in series, an anoxic denitrification reactor, then a aerobic nitrification reactor provided with an oxygen supply, a recycling pipe being connected between the exit of the aerobic nitrification reactor and the anoxic denitrification reactor;

the mechanical means for turbulent agitation comprise an agitator;

this agitator comprises blades offset along a drive shaft and shaped in such a way that they cause flows in opposite directions along this shaft;

this agitator is positioned vertically;

the granular material is of mineral type, for example fine sand;

the granular material has, in the mixing zone, a concentration of between 5 and 100 g/l., or between 5 and 50 g/l., the granular material is sand of granulometry of between 80 and 200$\mu$;

the installation comprises line of physical (for example of mechanical type) separation starting from the loaded granular material drainage channel in parallel with the recycling pipe and ending at a biomass loaded granular material re-injection pipe ending at the mixing zone or upstream of the latter;

this installation comprises a degassing zone between the mixing zone and the separation zone; and the separation zone is a decanter, which can contain laminar decantation elements; the separation can also be effected by any other appropriate means such as centrifugation, sieving, or filtration in particular over a membrane.

BRIEF DESCRIPTION OF THE DRAWINGS

The characteristics and advantageous subjects of the invention emerge from the description which follows, given as a non-limitative example, with regard to the attached drawings on which.

DETAILED DESCRIPTION OF THE INVENTION

Figure 1:
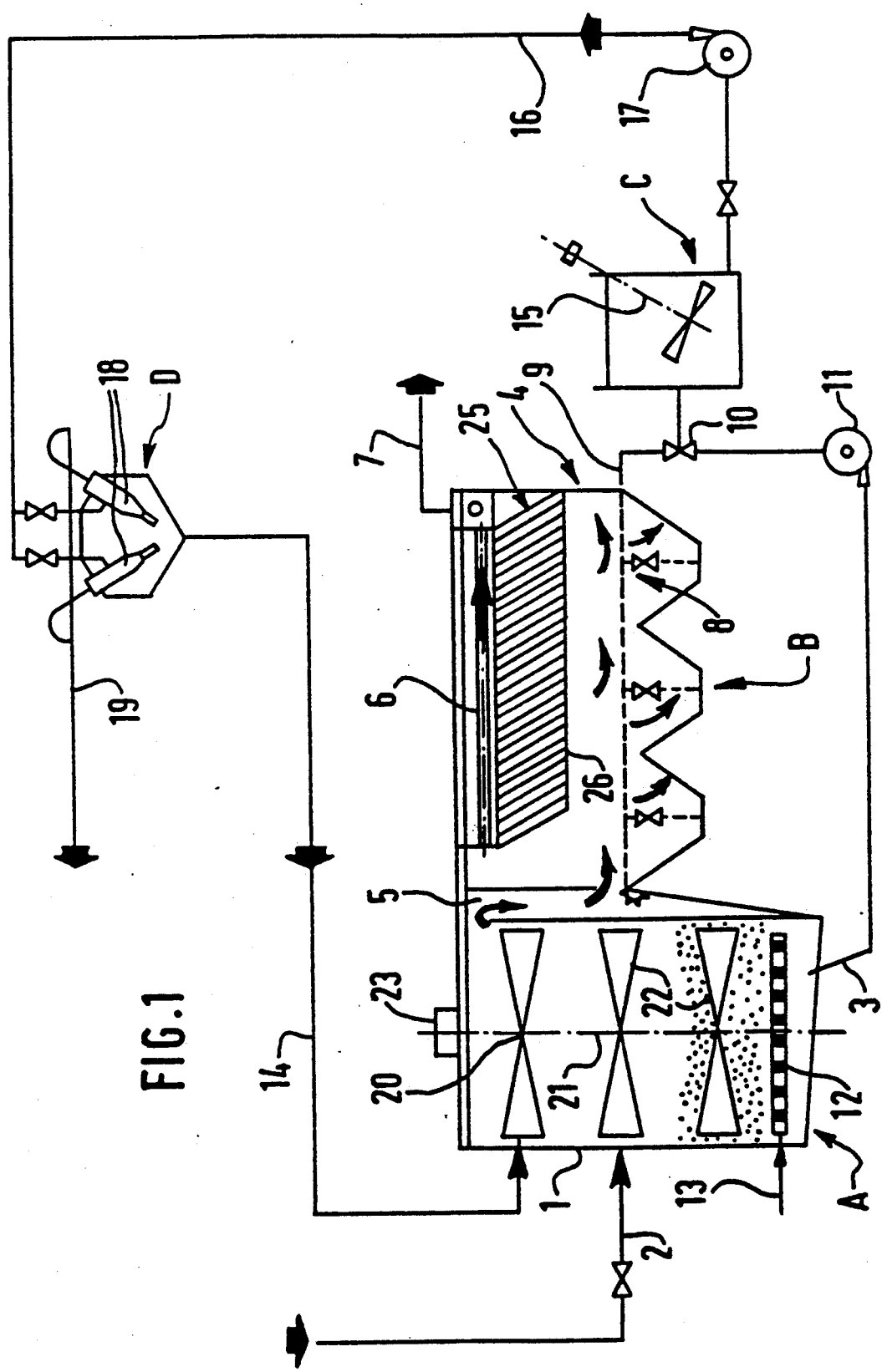
FIG. 1 is a simplified schematic view of a biological treatment installation in accordance with the invention.

The biological treatment installation represented in FIG. 1 includes principally a mixing zone A and a separation zone B.

The mixing zone A contains at least one mixing reactor 1 (here one) containing a granular material loaded with biomass and into which opens a supply pipe 2 for water to be treated, and a recycling pipe 3 for almost the whole of biomass loaded granular material, while the separation zone B comprises a chamber 4 communicating with the mixing reactor 1, here by the intermediary of a vertical degassing corridor 5; this chamber 4 is fitted with collection (recovery) means 6 ending at a drainage pipe 7 for clarified water, as well as means 8 for the extraction of the granular material loaded with biomass ending at a drainage pipe 9 for loaded granular material. A derivation control valve is provided on this pipe 9 from where the above mentioned recycling channel 3 starts. This is in practice fitted with pumping means 11.

In a preferred case nitrogen pollution in the form of ammonium hydroxide, or even B.O.D. aeration means are also provided in the mixing reactor 1, here constituted by an aeration manifold comprising pierced tubes 12 positioned at the bottom of the reactor, which are connected to an air or oxygen supply pipe. As a variation which is not represented, these aeration means are constituted by a surface aeration turbine. The air injection supply, is advantageously chosen in such a way as to transfer into the water between 4 and 5 kg of oxygen per kg (N—NH$_4$), for nitrification, and between 0.5 and 1.5 kg of oxygen per kg (B.O.D.) for the elimination of B.O.D.

In the fashion which is also preferred, a pipe 14 for the injection of granular material also goes into this reactor, the granular material advantageously obtained by recovery of the granular material loaded with (active) biomass contained in a possible non-recycled fraction of the loaded granular material leaving the separation chamber 4 by the pipe 9. To this effect, the said non-recycled fraction circulates via the valve 10 in a recovery/separation line here comprising a container C for the reception of loaded granular material fitted with an agitator 15 and a recovery/separation device D. A pipe 16 comes from the reception container C, and is fitted with pumping means 17, which ends at the device D: this comprises in practice hydrocyclones 18 at the exit of which sludges without granular material are drained off via a pipe 19, and the biomass loaded granular material is drained off via pipe 14, in an appropriate physical state to allow it to be re-injected into the mixing reactor 1. As a variation which is not represented, the recovery can be brought about, in particular, by sieving, by moderate power ultrasound, by centrifuging, by chemical or biological means (for example by leaving loaded granular material to rest for a certain time without nourishment and/or oxygenation).

In the mixing reactor 1 are provided mechanical means 20 for turbulent agitation, here constituted by an agitator comprising a vertical shaft 21 carrying blades 22 and turned by a motor 23.

In the separation chamber 4 are provided separating means 25, here of static type, for example constituted by laminar decantation blocks 26.

In the example represented in FIG. 1, the supply pipe 2 for water to be treated opens out approximately halfway up in the reactor. However, taking into account the turbulent agitation brought about by the agitator, the position of the water supply can be of any height.

Also it is only as a preferred example that the supply which leaves the reactor goes into the upper part of the degassing corridor while this supply then goes into the lower part of the separation chamber; as a variation which is not represented the flow into the degassing corridor can be achieved from bottom to top, or horizontally on the side of the reactor 1 and the chamber 4. This corridor 5 can even be omitted in certain cases.

The water to be treated biologically, arriving via the pipe 2, has in practice undergone a standard physical pre-treatment in order to eliminate at least the large particles ($\geq 1$ mm) in suspension (in practice of a size greater than or equal to that of the granular material). This pre-treatment comprises a screening, or a sieving, and a de-sanding advantageously completed by a de-oiling, or by a primary decantation. Except in certain cases (in particular dephosphatation) this pre-treatment does not include complete chemical treatment before the water enters the reactor; however there may be, if necessary, an injection of additives just before the entrance of this reactor.

In a preferred fashion the granular material contained in the mixing reactor has a granulometry of between 20 and 500$\mu$. It is preferably fine sand, a material which constitutes, for a reasonable investment cost, a suitable support for the fixation and development of a biomass; the granulometry of this sand is preferably chosen between 80 and 200$\mu$.

The concentration of this material in the reactor 1 is maintained in a pre-determined range, for example between 5 and 100 g/l., preferably between 5 and 50 g/l. For example about 20 g/l., in the case of sand.

The turbulent agitation effected by the mechanical agitator 20 aims to maintain this granular material in suspension according to a more or less homogeneous distribution.

The blades 22 of the agitator are advantageously distributed at several levels and are preferably shaped in such a way that they cause vertical flows in opposite directions along the shaft 21.

This turbulent agitation is in practice suitable for bringing about, inside the reactor, an internal re-circulation of about 5 to 100 times the incident supply of water to be treated.

The biomass which develops on the granular material is of a nature which depends on the organic load contained in the water to be treated and on the existence or not in the reactor of an oxygenation source. In the case where there is an oxygenation (See FIG. 1), the presence of a large organic load (B.O.D.) in the incident water encourages the development of bacteria which consume organic particles to the detriment of bacteria which are able to consume ammonium hydroxide. If on the other hand the organic load is low, the bacteria which develop (slow to develop but they are strongly adherent) can convert ammonium hydroxide into nitrates. Finally, if the organic load is greater than zero, and there is no oxygenation, there is a third type of bacteria which develops, suitable to convert the nitrates into nitrogen. Taking into account the inconveniences connected with the formation of nitrates, it may be advantageous, as will be seen further on, to provide two successive mixing reactors to degrade the ammonium hydroxide into nitrogen. In fact, one can select the predominant type of bacteria thanks to an appropriate preliminary seeding; one can also, with a view for example to enhance nitrification, dope the water by injection of ammonium hydroxide. It is therefore to be noted that nitrificating bacteria keep being fixed on the granular material even during recovery/separation.

Taking into account that, after the time spent by the water to be treated in the reactor 1 which is on the average more or less constant, all of this water passes into the separation chamber, there is no significant accumulation of granular material in the reactor. The concentration of this granular material can remain more or less constant in the reactor, with an approximately constant concentration of biomass. Almost all of the granular material leaving the separation chamber via the pipe 9 must be reinjected into the reactor 1 via the recycling pipe 3, the pipe 14 only bringing about a booster injection. In practice, as least three-quarters, if not 90% (or even more), of the granular material leaving the chamber 4 via the pipe 9, is re-injected; taking into account the suitability of this "sludge" to be pumped (fluidity). It appears that it is necessary to re-inject this loaded material with a supply amounting to between 10 and 500% of the incident supply of water to be treated. This recycling rate is lower the more concentrated the granular material suspension. In practice this rate is defined as a function of the maximum concentration which can be envisaged.

Instead of ending in the reactor, the recycling pipe can, as a variation which is not represented, rejoin the pipe 2 just upstream of the reactor 1.

The use of the degassing corridor 5 is to free the mixture in suspension from air bubbles which could have been trapped during the turbulent agitation and which would tamper with the gravitational separation which is produced in the chamber 8 with loaded material which is heavier than the water.

EXAMPLES

Table 1 includes the numerical information corresponding to two systems of nitrification of ammonium hydroxide (here after elimination of the B.O.D.) obtained successively in the same pilot installation in accordance with that of FIG. 1 and such that:

the mixing reactor is of cylindrical form with a capacity of 30 liters for a height of 1 m;

the supply of untreated water to this reactor is controlled by a pump with a supply variable between 10 and 30 l./hr, the supply of which varies with time as a function of the volume of water to be treated;

there is a supply of about 20 to 150 l./hr for the recycling pump 11, that is 100 to 500% of the supply pump flow; and the decanter 25 is inclined at 60° C. (simulating a laminar decantation), and supplied via the bottom, the water treated being drained off by an over flow.

The incident water is at "E" level, according to the French norms, that is that it has a maximum content of Matter In Suspension (MIS) of 30 mg/l. for a Chemical Oxygen Demand (C.O.D.) of 90 mg/l. For the tests, the content of ammonium hydroxide of this water was increased by doping with 30 to 90 mg/l. of N—NH$_4$.

The figures of Table 1 correspond to the established system obtained with an incident load of 0.8 kg of N—NH$_4$ per cubic meter of reactor and per day. Two series of figures are given for each system of use, each series containing, if appropriate, the input and output values respectively.

The two successive systems of use have in common the fact that they bring into the reactor a content of granular material in suspension of 40 g/l., a biomass content of 0.7 g/l.—marked VMS (volatile matter in suspension)—for a total air supply of 0.5 m$^3$/hr which could be reduced, in an installation of true size, to about 0.1.

EXAMPLE IA

In the first mode of use the supply of water to be treated is 11 l/hr; this water is highly loaded with ammonium hydroxide (between 83 and 89 mg/l of nitrogen) for a C.O.D. of 42 to 50 mg/l., less than 10 mg/l. of MIS and an NO$_3$ content of 24 to 26 mg/l. expressed in N—NO$_3$. The system of use is defined by a recycling rate of 400 to 500%, a time of 3 hours spent in the reactor, a speed of 20 m/hr in the decanter and a HAZEN speed (characteristic of the decantation process) of 0.26 m/hr. A reduction rate of 66 to 72% in ammonium hydroxide is observed.

EXAMPLE IB

In the second mode of use, the supply of water to be treated is higher (28 l./hr); the content of ammonium hydroxide is half as much (40 or 56 mg/l. of nitrogen) as in the first case (no doping), for comparable C.O.D. and MIS contents. The recycling rate is less (200%) as well as the time spent in the reactor (one hour). The rate of reduction of ammonium hydroxide is also better (75 and 85%) than in first case.

It can be seen from the results of these two systems that the invention allows very high levels of nitrated pollution load eliminated per unit of volume of the reactor (0.7 to 1 kg (N—NH$_4$)/m$^3$). As a comparison, an installation based on the principle of activated sludges results in values at the most equal to about 0.2 kg (N—NH$_4$)/m$^3$; (remember that the fluidized-bed principle is hardly used taking into account the strict operating constraints which are connected to it).

It is important to note that the invention arrives at these results by departing from the practice of the experts in the field, in order to increase the performances, seek to achieve higher and higher biomass (y) contents. According to the present invention, this content is here lower than 1 g/l., which is lower than in the known processes.

Furthermore, the MOHLMANN index here is lower than 50 m, which indicates excellent values.

Figure 2:
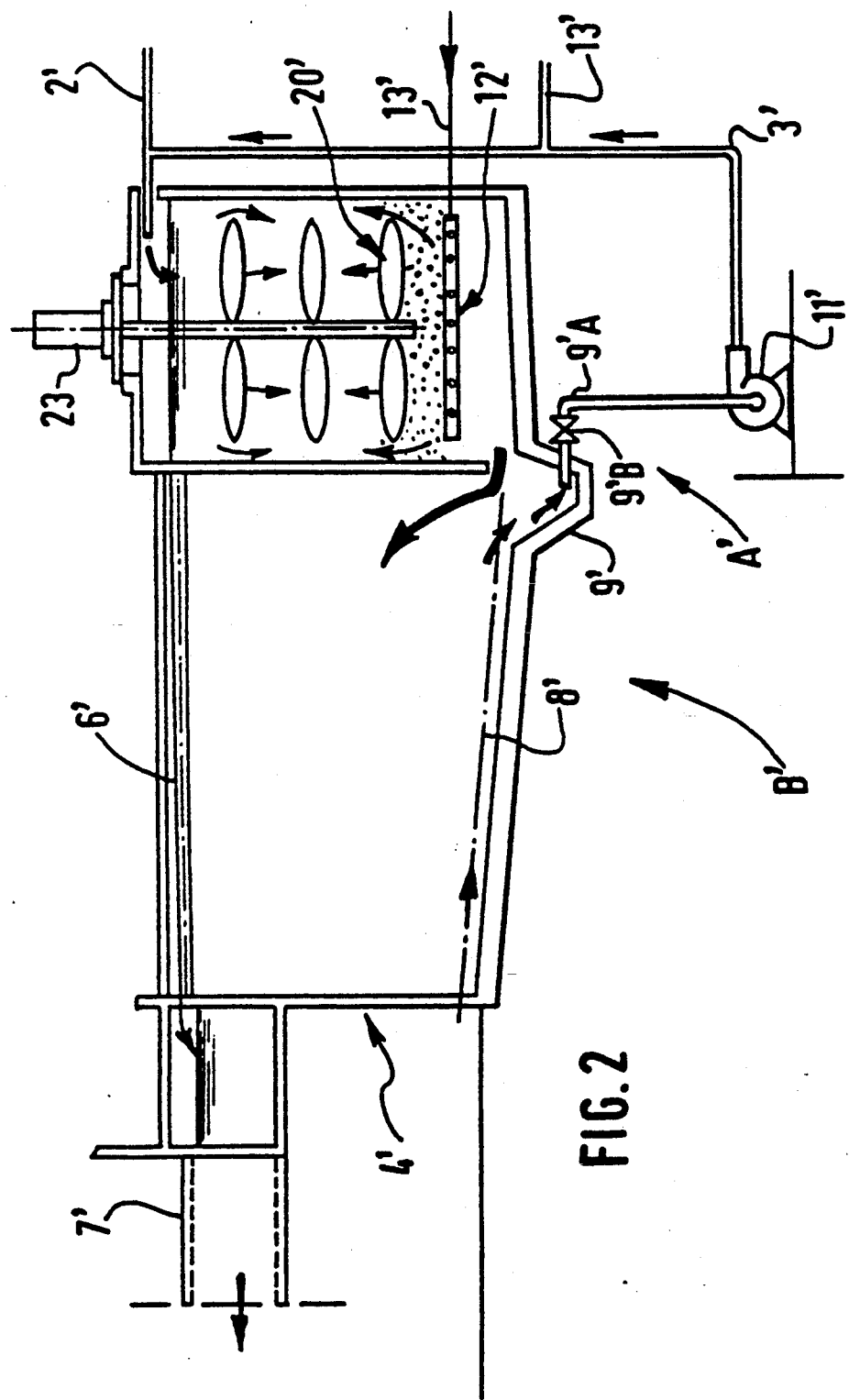
FIG. 2 is a partial schematic view of an embodiment variation of this installation.

FIG. 2 represents a biological treatment installation constituting an embodiment variation of that of FIG. 1. The recovery sequence is not represented here because it is not necessary in case of a pollution of only the nitrated type (N—NH$_4$ in particular). This installation is distinguished from that of FIG. 1 by the fact that the mixing zone A' communicates directly with the separation zone B', without a degassing corridor. In addition, the recycling is carried out internally.

The mixing zone A' is quite similar to that of FIG. 1 (with addition of the "primary" index to the reference figures designating the elements similar to those of FIG. 1). The injection of water to be treated is effected in the upper part of the reactor 1' while the communication with the separation zone is effected in the lower part, by an underflow. The water-granular material separation is effected here by simple gravity. The bottom of the separation chamber 4' is inclined towards the reactor and is fitted with raking means 8' which tends to force the loaded granular material into a recovery chute 9' situated under the communication zone by an underflow between the zones A' and B'. This chute 9' is fitted with an extraction nozzle 9'A communicating through a valve 9'B with a line 3' for loaded granular material recycling fitted as previously with pumping means 11'. An optional injection 13' of booster granular material is advantageously effected into this recycling nozzle downstream (or upstream) of the previously-mentioned pump which is not represented.

This installation can also be used to degrade simultaneously the organic load of the water to be treated. Abundant sludges are formed which in practice makes it very useful to proceed to a recovery by separation of the granular material and to drain off the excess biomass.

The installation of FIG. 2 has the advantage of being very compact.

It can be noticed that, in this example of FIG. 2, the recycling nozzle is attached, not to the reactor 1' but to the pipe 2 for admitting water to be treated.

Figure 3:
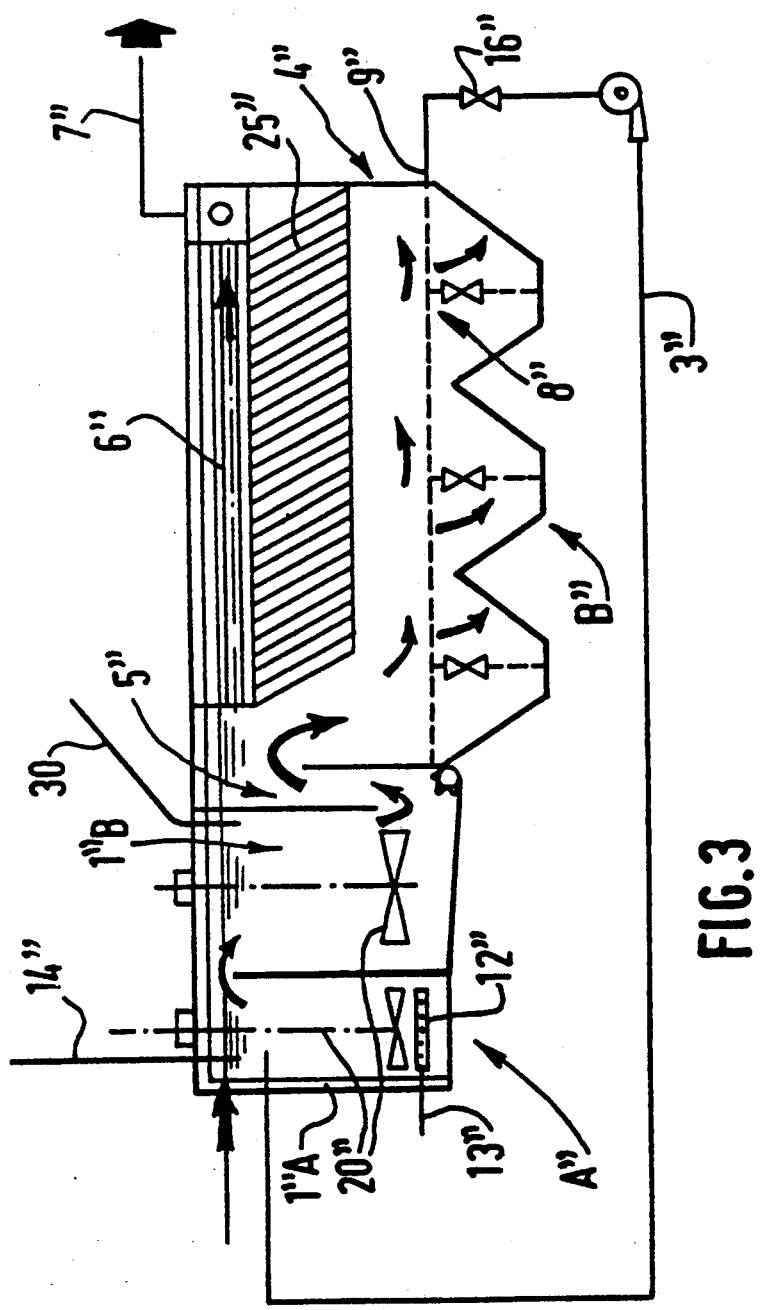
FIG. 3 is a simplified schematic view of yet another embodiment variation of an installation in accordance with the invention, corresponding to a combined nitrification/denitrification treatment.

FIG. 3 is a variation (schematic), with several reactors in series, of the installation of FIGS. 1 or 2, suitable for a nitrification-denitrification treatment of the water to be treated, combined with B.O.D. treatment.

This installation comprises a first reactor 1"A similar to that of FIGS. 1 and 2 and including an oxygenation manifold 12": it establishes an aerobic system which encourages bacteria which convert the ammonium hydroxide into nitrates. They can be enhanced through initial seeding. This reactor 1"A communicates, here by an over-flow, with a second mixing reactor 1"B which is distinguished from that of FIGS. 1 and 2 by the absence of any source of oxygenation (anaerobic environment). A source of organic carbon (for example i the form of methanol, molasses, acetic acid . . . ) is injected into it here at position 30. This injection of substrate encourages the development of bacteria which convert the nitrates formed in the mixing reactor 1"A into gaseous nitrogen. This second reactor communicates by an underflow with a degassing chimney 5" then enters the separation zone 4". As note previously, most of the loaded granular material collected in the decantation zone B" are recycled.

According to another embodiment solely dedicated to denitrification, the first reactor 1"A is done away with.

Figure 4:
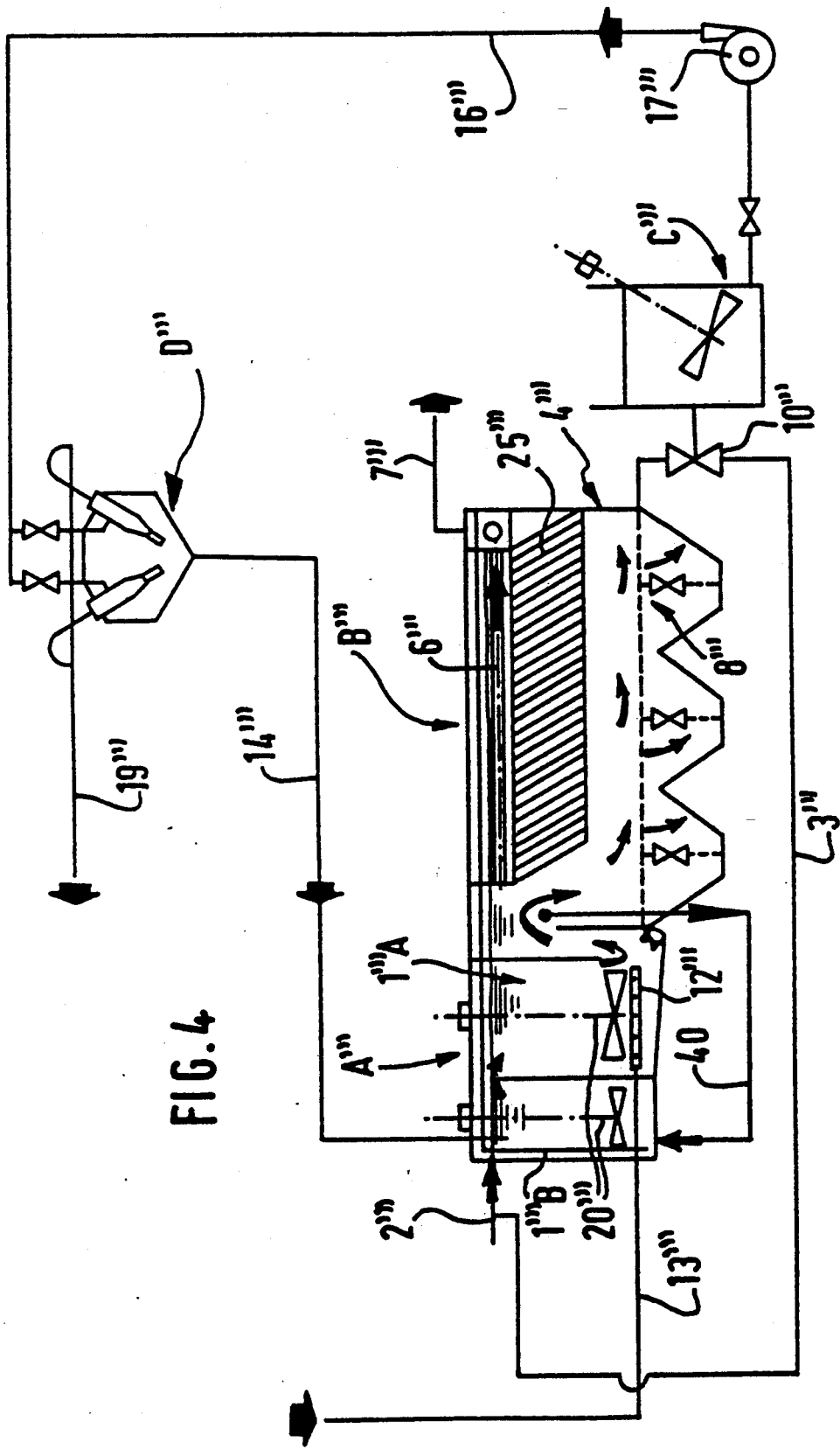
FIG. 4 is an embodiment variation of the installation of FIG. 1, corresponding as in FIG. 3 to a nitrification/denitrification treatment.

FIG. 4 is a variation of FIG. 1 which comprises two mixing reactors 1'''A and 1'''B which correspond to the reactors 1"A and 1"B of FIG. 3, but the liquid to be treated passes through them in a reverse order that of FIG. 3. In effect, the liquid to be treated first passes through the reactor 1'''B which is maintained in an anaerobic condition and then through the reactor 1'''A which is maintained in an aerobic condition. A pipe 40 fitted with pumping means which are not represented allows the liquid, loaded with granular material, to be recycled from the exit of the reactor 1'''A towards the reactor 1'''B. Consequently, the nitrates formed in the reactor 1'''A are re-injected into the reactor 1'''B there to be converted into gaseous nitrogen by bacteria feeding on the organic carbon contained in the liquid to be treated. In practice, the supply for recycling between the exit of reactor 1'''A and the entrance of reactor 1'''B is between 1 and 6 times (preferably between 2 and 4 times) the incident supply of water to be treated.

As noted previously, there is recycling of the granular material coming from the separation zone 4''' towards the mixing zone (preferably towards reactor 1'''B, or if not towards reactor 1'''A) through a line 3'''.

This installation of FIG. 4 can sometimes be preferred for the treatment of effluent while the installation of FIG. 3 can sometimes be preferred for the preparation of drinking water.

It goes without saying that the above description has been put forward only as a non-limitative example and that numerous variations can be put forward by an expert without departing from the scope of the invention.

Thus, for example, the granular material preferably of natural (mineral) type, instead of fine sand, can be chosen from the following materials: clay, clinoptilolite, pumice, or kaolinite, these examples being non-carbonaceous.

We claim:

1. A method for biological treatment of sewage effluent water containing nitrogen pollution, comprising:
bringing an incident flow of said sewage into a mixing zone with at least one compartment and effecting, by high turbulent mechanical agitation within said compartment, homogeneous suspension of a substantially unconsumable and insoluble granular material in a concentration of at least about 5 g/l, loaded with biomass in a concentration of less than 1 g/liter, in said sewage, and maintaining a generally constant mass concentration in said homogeneous suspension;
circulating said sewage and said granular material in suspension to a separation zone and decanting clarified water from the granular material loaded with active biomass using laminar flow decantation; and
effecting forced and direct recycling of at least 75% of the active biomass fixed to said granular material to the mixing zone.

2. The method according to claim 1, wherein the nitrogen pollution is in the form of ammonium hydroxide, oxygen is further injected into the mixing zone in an amount sufficient to encourage the development of a biomass which consumes the pollution contained in the sewage to be treated.

3. The method according to claim 2, wherein said oxygen is injected in the form of air.

4. The method according to claim 1, wherein the nitrogen pollution is in the form of nitrate, a source of organic carbon is also injected into this mixing zone and said mixing zone is maintained as an anaerobic environment.

5. The method according to claim 1, the nitrogen pollution being in organic form or in the form of ammonium hydroxide, the mixing zone comprising in series an aerobic nitrification zone in which said homogeneous suspension is effected by said turbulent mechanical agitation and into which oxygen is injected and downstream thereof an anaerobic denitrification zone into which said homogeneous suspension is entered and maintained by a second turbulent mechanical agitation and into which a source of organic carbon is injected, said forced and direct recycling being effected to said aerobic nitrification zone.

6. The method according to claim 1, wherein the nitrogen pollution is in organic form or in the form of ammonium hydroxide, the mixing zone comprises in series an anaerobic denitrification zone in which said homogeneous suspension is effected by said turbulent mechanical agitation then an aerobic nitrification zone into which said homogeneous suspension is entered and maintained by a second turbulent mechanical agitation and into which oxygen is injected, and water loaded with granular material leaving the aerobic nitrification zone is recycled towards the anaerobic denitrification zone with a flow at least equal to the incident flow of sewage, said forced and direct recycling from said separation zone being effected to said anaerobic denitrification zone.

7. The method according to claim 1, wherein the granular material that is put in a homogeneous suspension is fine sand.

8. The method according to claim 1 wherein the granular material contained in a non-recycled residual part of the granular material extracted with sludges from the separation zone is recovered by separation and re-injected together with fixed biomass into the mixing zone, and sludges separated from this granular material are drained off.

9. The method according to claim 1, wherein the concentration of granular material in the mixing zone is maintained approximately at a value of between 5 and 100 g/l.

10. The method according to claim 9, characterized in that the concentration of granular material when it is fine sand is maintained at a value of between 5 and 50 g/l.

11. The method according to claim 1, wherein the turbulent agitation causes an internal recycling of between 5 and 100 times the incident sewage.

12. The method according to claim 11 wherein the suspension is returned to the mixing zone by forced recycling in a flow amounting to between 100 and 500% of the incident flow of sewage.

13. The method according to claim 1 wherein said forced and direct recycling is effected upstream of the mixing zone.

14. The method according to claim 1, wherein the homogeneous suspension is left to degas before being passed into the separation zone.

15. Installation for biological treatment of a pretreated sewage effluent water containing a nitrogen pollution comprising:
a mixing zone with at least one compartment provided with a pipe means for admitting water to be treated and a mechanical means for high turbulent agitation within said compartment, said mixing zone containing a substantially unconsumable and insoluble granular material in a concentration of at least about 5 g/l loaded with fixed biomass in a concentration of less than about 1 g/l forming a homogeneous suspension;
a separation zone downstream of the mixing zone provided with an inlet for said homogeneous suspension and with a first channel means for draining off clarified water and a second channel means for draining off the granular material loaded with fixed biomass, said separation zone including a lamellar decantation device; and
a recycling pipe fitted with a pumping means for pumping said granular material loaded with fixed biomass, said recycling pipe connecting the second channel means and the mixing zone.

16. Installation according to claim 15, wherein the mixing zone includes a mixing reactor containing oxygenation means.

17. Installation according to claim 16, wherein the oxygenation means are formed by an oxygenation manifold.

18. Installation according to claim 15, wherein the mixing zone comprises in series an aerobic nitrification reactor provided with said mechanical means for turbulent agitation and including an oxygen input and an anaerobic denitrification reactor provided with a second mechanical means for turbulent agitation and including an organic carbon inlet pipe, said recycling pipe connecting said second channel to said aerobic nitrification reactor.

19. Installation according to claim 15, wherein the mixing zone comprises in series an anaerobic denitrification reactor provided with said mechanical means for turbulent agitation, then an aerobic nitrification reactor provided with a second mechanical means for turbulent agitation and with an oxygen input, a second recycling pipe being connected between the exit of the aerobic nitrification reactor and the anaerobic denitrification reactor, said recycling pipe connecting said second channel to said anaerobic denitrification reactor.

20. Installation according to claim 15, wherein the mechanical means for turbulent agitation comprise an agitator.

21. Installation according to claim 20, wherein this agitator comprises blades offset along a drive shaft and shaped in such a way as to cause flows in opposite directions along this shaft.

22. Installation according to claim 20, wherein this agitator is positioned vertically.

23. Installation according to claim 15, wherein the granular material is fine sand.

24. Installation according to claim 15, wherein said homogeneous suspension has a concentration of between 5 and 100 g/l. of said granular material in the form of fine sand loaded with fixed biomass.

25. Installation according to claim 15, wherein said homogeneous suspension has a concentration of between 5 and 50 g/l. of said granular material in the form of fine sand loaded with fixed biomass.

26. Installation according to claim 15, wherein granular material has a granulometry of between 20 and 500 $\mu$m.

27. Installation according to claim 26, wherein the granular material is sand of a granulometry of between 80 and 200 $\mu$m.

28. Installation according to claim 15, further comprising a recovery/separation line starting from the loaded granular material drainage channel downstream of the recycling pipe and ending at a biomass loaded granular material re-injection pipe ending into or upstream of the mixing zone.

29. Installation according to claim 28, wherein the recovery line includes at least one hydrocyclone (D).

30. Installation according to claim 15, further comprising a degassing zone between the mixing zone and the separation zone.

31. A method for biological treatment of sewage effluent water containing nitrogen pollution, comprising:
    bringing an incident flow of said sewage into a mixing zone with at least one compartment and effecting, by high turbulent mechanical agitation within said compartment, homogeneous suspension of a substantially unconsumable and insoluble granular material in a concentration of at least about 5 g/l, loaded with biomass in a concentration of less than about 1 g/l, in said sewage, and maintaining a generally constant mass concentration in said homogeneous suspension;
    circulating said sewage and said granular material in suspension to a separation zone and extracting, using laminar flow decantation, clarified water from the granular material loaded with active biomass; and
    effecting forced and direct recycling of at least 90% of the active biomass fixed to said granular material to the mixing zone.

32. A method according to claim 31 wherein substantially all of said active biomass fixed to said granular material is recycled to the mixing zone.

33. A method for biological treatment of sewage effluent water containing nitrogen pollution, comprising:
    bringing an incident flow of said sewage into a mixing zone with at least one compartment and effecting, by turbulent mechanical agitation within said mixing zone compartment, homogeneous suspension of a substantially unconsumable and insoluble granular material, loaded with biomass, in a concentration of less than about 1 g/l, in said sewage, and maintaining a generally constant mass concentration in said homogeneous suspension while providing sufficient turbulence to effect an internal recycling of at least 10 times the feed rate of said incident flow of sewage;
    circulating said sewage and said granular material in suspension in a separation zone including lamellar decantation elements and extracting by laminar flow decantation clarified water and the granular material loaded with active biomass; and
    effecting forced and direct recycling of at least 75% of the active biomass fixed to said granular material to the mixing zone;
    said granular material being sand having a granulometry of between 80 and 200 μm at a mass concentration in said homogeneous suspension of between 5 and 50 g/l.

34. A method according to claim 33, wherein said high turbulent agitation is sufficient to effect an internal recycling of between 10 and 100 times the feed rate of said incident flow of sewage, and wherein said recycling of the active biomass fixed to said granular material to the mixing zone is in an amount between 100% and 500% of the incident flow of said sewage into the mixing zone.

35. A method for biological treatment of sewage effluent water containing nitrogen pollution in organic form or in the form of ammonium hydroxide, comprising:
    bringing an incident flow of said sewage into a first zone and effecting, by high turbulent mechanical agitation in said first zone, an homogeneous suspension of a substantially unconsumable and insoluble granular material in a concentration of at least about 5 g/l loaded with biomass in a concentration of less than about 1 g/l in said sewage and maintaining a generally constant mass concentration in said homogeneous suspension while effecting a first biological treatment;
    circulating said homogeneous suspension into a second zone maintaining said suspension homogeneous by a second high turbulent mechanical agitation in said second zone while effecting a second biological treatment;
    circulating said suspension from said second zone to a separation zone containing lamellar decantation elements and extracting by laminar flow clarified water and the granular material loaded with active biomass; and
    effecting forced and direct recycling of at least 75% of active biomass fixed to said granular material to said first zone.

36. A method according to claim 35, wherein said first zone is an aerobic nitrification zone and said second zone is an anaerobic denitrification zone, said method comprising injecting oxygen into said aerobic nitrification zone and injecting a source of organic carbon into said anaerobic denitrification zone, and further comprising recycling a part of said homogeneous suspension from said anaerobic denitrification zone into said anaerobic nitrification zone with a flow at least equal to the incident flow of sewage.

37. A method according to claim 35, wherein said first zone is an anaerobic denitrification zone and said second zone is an aerobic nitrification zone, and comprising injecting a source of organic carbon into said anaerobic denitrification zone, injecting oxygen into said aerobic nitrification zone, and recycling a part of said homogeneous suspension from said aerobic nitrification zone to said anaerobic denitrification zone with a flow at least equal to the incident flow of sewage.

38. An apparatus for biological treatment of a pretreated sewage effluent water containing a nitrogen pollution, comprising:
    a mixing zone with at least one compartment provided with a pipe means for admitting water to be treated and a mechanical means for high turbulent agitation within said compartment, said mixing zone containing a substantially unconsumable and insoluble granular material loaded with fixed biomass in a concentration of less than about 1 g/l forming a homogeneous suspension;
    a separation zone downstream of the mixing zone provided with an inlet for said homogeneous suspension and fitted with a first channel means for draining off clarified water and a second channel means for draining off the granular material loaded with fixed biomass, said separation zone including lamellar decanting elements; and
    a recycling pipe fitted with a pumping means for pumping said granular material loaded with fixed biomass, said recycling pipe connecting the second channel means and the mixing zone;
    said granular material being sand having a granulometry of between 80 and 200 μm at a mass concentration in said homogeneous suspension of between 5 and 50 g/l.

39. An apparatus for biological treatment of a pretreated sewage effluent water containing a nitrogen pollution, comprising:
- an aerobic nitrification reactor provided with a pipe means for inlet of water to be treated, with means for feeding oxygen therewithin and with a first mechanical means for high turbulent agitation therewithin, said aerobic nitrification reactor containing a substantially unconsumable and insoluble granular material in a concentration of at least about 5 g/l loaded with fixed biomass in a concentration of less than about 1 g/l forming a homogeneous suspension;
- an anaerobic denitrification reactor connected to exit of said aerobic nitrification for circulation of said suspension, provided with a second mechanical means for turbulent agitation therewithin and with an organic carbon inlet pipe;
- a separation zone downstream of said anaerobic denitrification reactor, provided with an inlet for said suspension and with a first channel means for draining off clarified water and a second channel means for draining off said granular material loaded with fixed biomass; and
- a recycling pipe provided with a pumping means for pumping said granular material loaded with fixed biomass, said recycling pipe connecting said second channel means to said aerobic nitrification reactor.

40. An apparatus for biological treatment of a pretreated sewage effluent water containing a nitrogen pollution, comprising:
- an anaerobic denitrification reactor provided with a pipe means for inlet water to be treated and with a first mechanical means for turbulent agitation therewithin, said anaerobic denitrification reactor containing a substantially unconsumable and insoluble granular material in a concentration of at least about 5 g/l loaded with fixed biomass in a concentration of less than about 1 g/l forming a homogeneous suspension;
- an aerobic nitrification reactor connected to said anaerobic denitrification for circulation of said suspension, provided with an oxygen feeding input and with a second mechanical means for turbulent agitation therewithin;
- a first recycling pipe between exit of said aerobic nitrification reactor and said anaerobic denitrification reactor;
- a separation zone downstream of said aerobic nitrification reactor, provided with an inlet for said suspension, with a first channel means for draining off clarified water and with a second channel means for draining off said granular material loaded with fixed biomass; and
- a second recycling pipe provided with pumping means for pumping said granular material loaded with fixed biomass, said second recycling pipe connecting said second channel means to said anaerobic denitrification reactor.

* * * * *